United States Patent [19]
Katoh et al.

[11] Patent Number: 5,237,966
[45] Date of Patent: Aug. 24, 1993

[54] FUEL INJECTION SYSTEM FOR THE TWO CYCLE ENGINE

[75] Inventors: Masahiko Katoh; Masanori Takahashi; Seiji Inoue, all of Hamamatsu, Japan

[73] Assignee: Sanshin Kogyo Kabushiki Kaisha, Hamamatsu, Japan

[21] Appl. No.: 843,444

[22] Filed: Feb. 28, 1992

[30] Foreign Application Priority Data

Feb. 28, 1991 [JP] Japan .................. 3-58047

[51] Int. Cl.⁵ .............................. F02B 33/04
[52] U.S. Cl. ..................... 123/73 C; 123/470; 123/73 PP; 123/73 B
[58] Field of Search .......... 123/531, 533, 470, 471, 123/73 C, 73 B, 73 PP, 298, 305, 65 BA; 234/533.12, 440

[56] References Cited

U.S. PATENT DOCUMENTS

| | | |
|---|---|---|
| 4,768,474 | 9/1988 | Fujimoto et al. .................. 123/73 B |
| 4,790,270 | 12/1988 | McKay et al. ..................... 123/73 C |
| 4,984,540 | 1/1991 | Morikawa ......................... 123/73 C |
| 5,054,456 | 10/1991 | Rush et al. ........................... 123/470 |
| 5,063,886 | 11/1991 | Kanamaru et al. ................ 123/73 C |
| 5,105,775 | 4/1992 | Maissant ......................... 123/73 PP |

FOREIGN PATENT DOCUMENTS 62-87634  4/1987  Japan .
62-253920 11/1987 Japan .

*Primary Examiner*—Willis R. Wolfe
*Assistant Examiner*—M. Macy
*Attorney, Agent, or Firm*—Ernest A. Beutler

[57] ABSTRACT

Several embodiments of fuel injection systems for two cycle internal combustion engines wherein fuel is injected into a conduit for delivery into the combustion chamber through a port in the cylinder liner. A nozzle insert is positioned in the conduit and has a restricted opening that forms the discharge through which fuel and gas under pressure are supplied to the combustion chamber for facilitating servicing and replacement.

26 Claims, 4 Drawing Sheets

FUEL INJECTION SYSTEM FOR THE TWO CYCLE ENGINE

BACKGROUND OF THE INVENTION

This invention relates to a fuel injection system for a two cycle engine and more particularly to an improved fuel injection nozzle arrangement for such an engine.

The advantages of fuel injection over carburetion are well known. Normally fuel injectors inject either directly into the combustion chamber (direct injection) or into the induction system (manifold or port injection). Each system has its own advantages and disadvantages. A difficulty with direct injection methods is that the fuel injector is subjected to the combustion chamber temperatures and pressure as the gases burn and expand. This dictates the use of expensive fuel injectors and also can give rise to the problem of servicing the fuel injector and maintaining its injection valve components free of foreign particles formed primarily by the combustion process.

Manifold injection, on the other hand, avoids the problems of direct cylinder injection but also loses many of the advantages of direct injection. That is, when direct cylinder injection is employed, it is possible to provide a stratified charge under low and medium speed running operations and hence both fuel efficiency and exhaust emission control are improved. However, with manifold injection, the ability to obtain stratification is substantially reduced due to the distance that the fuel charge flows from the injector into the combustion chamber.

Another type of fuel injector has also been proposed and may be used either with direct or manifold type of injection systems. This type of injector injects not only fuel under pressure, but also air under pressure. The air assists in dispersion and vaporization of the fuel particles. When utilized with either direct or manifold injection, the air fuel injectors have the same disadvantages as other types of fuel injectors. In addition, it is necessary with this type of injector to regulate the fuel and air pressure and provide separate valves for controlling the flow. Thus this type of injector is also more expensive, particularly if employed in conjunction with direct cylinder injection.

There are disclosed in the copending application of Masahiko Katoh and Masanori Takahashi, entitled "Fuel Injection System For Two Cycle Engine", Ser. No. 831,786, filed Feb. 5, 2992, still pending and assigned to the assignee hereof a number of embodiments of fuel injectors wherein the advantages of direct cylinder injection are employed without the disadvantages thereof by injecting fuel into the combustion chamber through one or more small nozzle ports formed in the cylinder liner and which are opened and closed by the movement of the pistons. Compressed air and fuel is supplied upstream of the nozzle port so as to provide an air fuel injection system which achieves stratification without the disadvantages of direct cylinder injectors and/or the prior art type of fuel air injectors.

Although the construction described in aforenoted copending application Ser. No. 831,786 has a number of advantages, for the most part, the embodiments of that application require the formation of the nozzle port in the cylinder wall or cylinder liner to be accurately positioned and sized. However, this means that servicing or replacement of the nozzle port is not easy and may, in fact, be difficult without completely disassembling the engine. Also, with the types of arrangement shown in that application, the amount of mixing of the fuel and air injected upstream of the nozzle port may be limited.

It is, therefore, a principal object of this invention to provide an improved fuel injection system for a two cycle engine having the advantages of direct and manifold fuel injection without the disadvantages of either and wherein the device may be easily serviced.

It is a further object of this invention to provide an improved air fuel injector that does not require separate valving and control for the air and fuel relative to each other and which has the advantages of both manifold and direct injection without the disadvantages of either.

SUMMARY OF THE INVENTION

This invention is adapted to be embodied in a fuel injection system for an internal combustion engine having a variable volume chamber defined by a pair of relatively movable components. A nozzle port extends through one of the components and is opened and closed by the relative movement of the components. A conduit extends to the nozzle port from externally of the combustion chamber and a nozzle insert is inserted into the conduit and has an inlet opening of a cross sectional area substantially the same as the conduit and an outlet opening juxtaposed to the nozzle port and having a substantially smaller effective flow area than the nozzle port. A chamber is formed between the inlet opening and the outlet opening and means delivers a pressurized gas to the chamber during at least a portion of the time when the nozzle port is open. A fuel injector also injects fuel into the chamber.

DETAILED DESCRIPTION OF THE PREFERRED EMBODIMENTS

Figure 1:
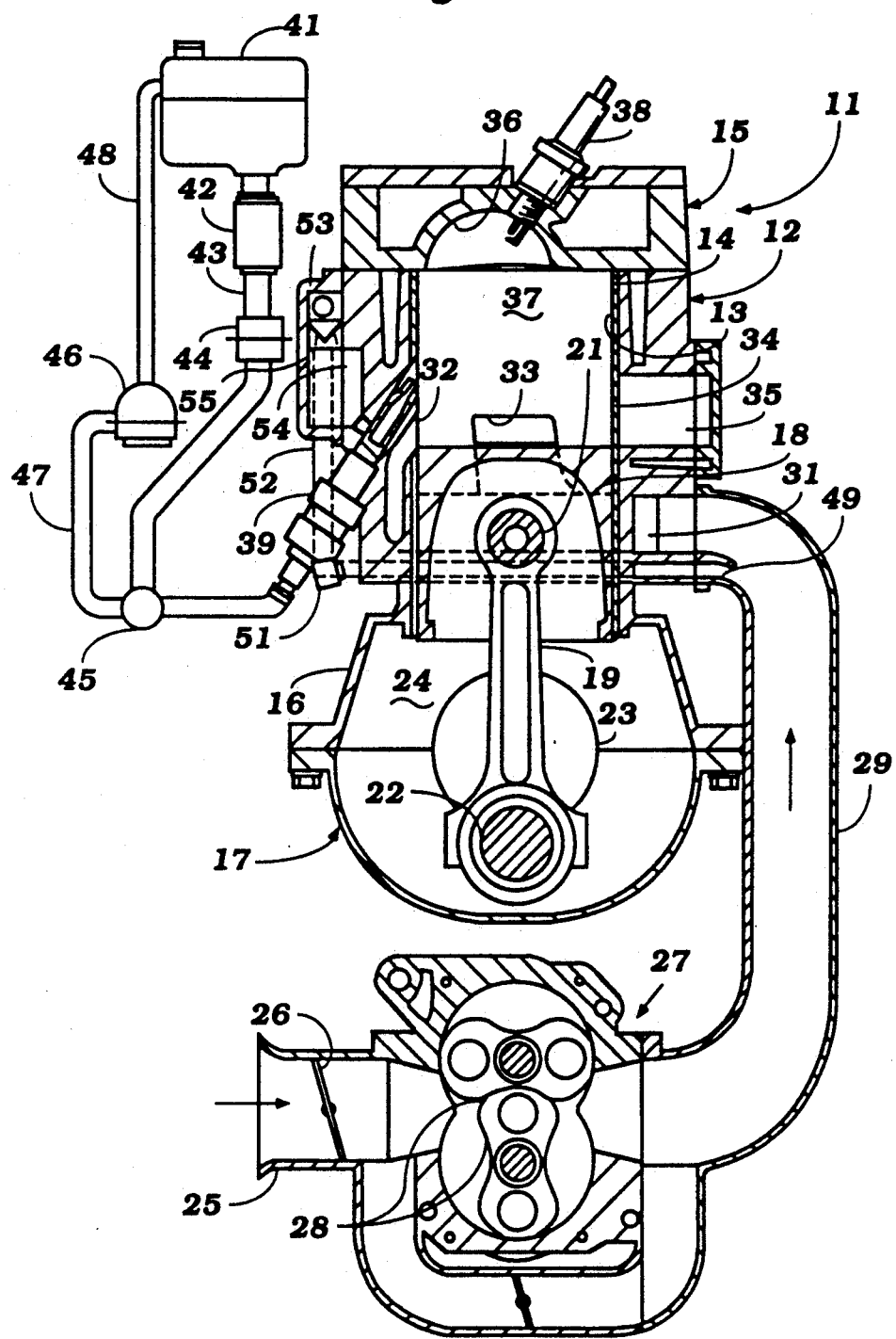
FIG. 1 is a cross sectional view taken through a single cylinder of an internal combustion engine constructed in accordance with a first embodiment of the invention.

Referring first to FIG. 1, a multi-cylinder internal combustion engine having a fuel injection system constructed in accordance with an embodiment of the invention is identified generally by the reference numeral 11. The invention is described in conjunction with a multi-cylinder reciprocating engine. However, it should be understood by those skilled in the art that the invention may also be employed in conjunction with a rotary type of engine. The application of the invention to such other types of engines and to multiple cylinder engines having varying cylinder configurations should be well within the scope of those skilled in the art in view of the following description.

The engine 11 includes a cylinder block assembly indicated generally by the reference numeral 12 in which one or more cylinder bores 13 are formed by pressed or cast in liners 14. One end of the cylinder bores 13 is closed by a cylinder head assembly 15 that is affixed to the cylinder block 12 in a known manner. A skirt 16 of the cylinder block 12 has affixed to it a crankcase member 17 which forms a closure for the other end of the cylinder bore 13.

A piston 18 reciprocates in each cylinder bore 13 and is connected to a connecting rod 19 by means of a piston pin 21. The lower end of the connecting rod 19 is journaled on a throw 22 of a crankshaft 23 that is rotatably journaled in a crankcase chamber 24 formed by the cylinder block skirt portion 16 and crankcase member 17.

An air charge for combustion in the engine 11 is drawn through an atmospheric air inlet device which may include a filter and/or silencing arrangement (not shown) which communicates with a throttle body 25 in which a manually operated throttle valve 26 is positioned. This air is delivered to a scavenge pump, indicated generally by the reference numeral 27 which, in the illustrated embodiment, is of the Rootes type and includes a pair of intermeshing rotors 28 that are driven from the crankshaft 23 in a suitable manner. The scavenge pump 27 outputs the pressurized air to a manifold 29 which terminates in a scavenge manifold 31 that at least in part circles the cylinder block 12 at its lower end around each of the cylinder liners 14. The scavenge manifold 31 delivers air to a main scavenge port 32 and a pair of circumferentially spaced side scavenge ports 33 which are opened and closed by the reciprocation of the piston 18.

An exhaust port 34 is provided in the cylinder liner 14 in confronting relationship with the main scavenge port 32 and delivers exhaust gases to an exhaust passage 35 which, in turn, communicates with an exhaust manifold and exhaust system (not shown) for exhausting the gases to the atmosphere.

The porting arrangement comprised of the main and side scavenge ports 32 and 33 and exhaust port 34 are configured so as to provide a Schnurle type of scavenging within the variable volume chamber formed by the piston 18, cylinder bore 13 and a recess 36 formed in the underside of the cylinder head 15 which variable volume chamber is indicated generally by the reference numeral 37 and is at times be referred to as the combustion chamber. It should be noted that the cylinder head recess 36 is offset from the axis of the cylinder bore 13 toward the main scavenge port 32 so as to improve the scavenging of the engine.

Spark plugs 38 are mounted in the cylinder head 15 with their gaps being disposed in the respective recesses 36 associated with each of the cylinder bores 13. The spark plugs 38 are fired in any suitable manner.

A system is also provided for injecting fuel and air under pressure into the combustion chamber 37 at a timed interval which will be described. This injection system includes a fuel injector 39 which is mounted in the cylinder block 12 in a manner to be described and which may be of the electrically controlled type. Fuel is supplied to the fuel injector 39 from a remotely positioned fuel tank 41 by means of a pressure pump 42 that is driven in a suitable manner and which discharges the fuel through a conduit 43 in which a filter 44 is disposed for delivery to a fuel rail 45 that supplies each of the injectors 39.

A pressure regulator 46 is connected with the manifold 45 through a conduit 47 and controls the fuel pressure supplied to the injectors 39 by bypassing excess fuel back to the tank 41 through a return conduit 48.

Manifold 29 has an air boost port 49 that delivers compressed air from the scavenge pump 27 to an air injection manifold 51 that is disposed on the opposite side of the cylinder block 12. The manifold 29 supplies air through a vertically extending conduit 52 which may be formed either integrally with the cylinder block 12 or separately from it and which terminates in an outlet port 53 associated with each cylinder bore 13. The outlet port 53 communicates with an accumulator chamber 54 through a check valve 55 which permits flow from the port 53 to the accumulator chamber 54 but not in the reverse direction. This construction may be best seen by reference to FIG. 2 and the description will proceed with primary reference to that figure.

The cylinder block 12 and cylinder liner 14 are provided with a conduit opening 56 that is disposed closely adjacent the main scavenge port 32 and will be open before and closed after the scavenge port 32 by the reciprocation of the piston 18. The injector nozzle 39 has a nozzle discharge port 57 which is opened and closed in any suitable manner and is surrounded by a nozzle insert, indicated generally by the reference numeral 58 that is sealed to the cylinder block 12 by means of a pair of 0 ring seals 59 and 61. The nozzle insert 58 has a first inlet opening 62 that is of a diameter substantially the same as the conduit 56 and a tapered end 63 that is provided with a nozzle port 64 that is substantially smaller in cross sectional area than the conduit 56. Fuel is sprayed into the inlet opening 62 from the injector nozzle 57 and will be discharged into the combustion chamber, in a manner to be described, during the reciprocation of the piston 18.

The nozzle insert 58 has a second opening 65 that is disposed adjacent its opening 62 which second opening 65 is generally perpendicular to the axis of the conduit 56 and also to the interior of the insert 58 and which communicates with an air port 66 that extends from the accumulator chamber 54 through the cylinder block 12 to the conduit 56. The air port 66 communicates with the area between the 0 ring seals 59 and 61 and hence air leakage will be precluded and all of the air will be delivered to the air port 65 of the nozzle insert 58.

Pressurized air is always present in the accumulator chamber 54 when the engine is running and as the piston 18 descends and opens the conduit 56, air under pressure will be discharged from the nozzle insert outlet opening 64 at a high velocity in a direction toward the cylinder head recess 36. The scavenge port 32 will then be subsequently opened and the scavenge charge will also enter the combustion chamber 37 so as to drive the exhaust gases out of the exhaust port 34.

As the piston 18 begins its upward movement, fuel will be injected by the fuel injector 39, the timing and duration being determined by the load on the engine, and this fuel will be entrained with the air flowing from the accumulator chamber 54 and discharged through the nozzle insert outlet opening 64 in an upward direction toward the spark plug 38. Fuel injection is stopped before the conduit 56 is closed. This operation will insure a stratified charge of fuel even under idle and low speed performance so as to insure good combustion in the combustion chamber. Also, the nozzle insert 58 is protected from the combustion of the gases by the piston until such a time as the charge is at a low enough temperature that no damage can occur.

It should be readily apparent that the injectors 39 may easily be removed so that the opening 64 can be inspected, cleaned or resized if desired.

Figure 2:
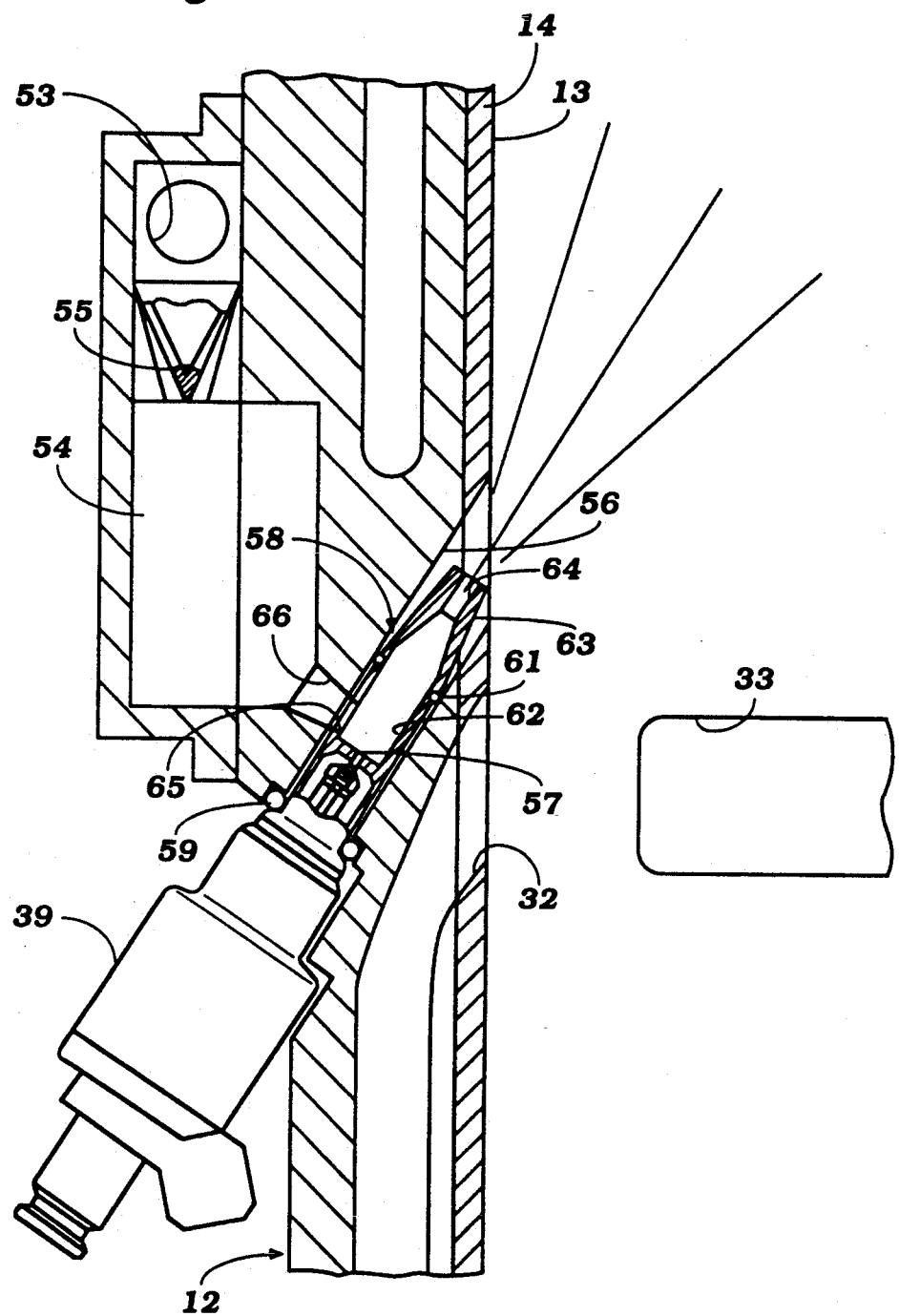
FIG. 2 is an enlarged cross sectional view taken through the nozzle port fuel, injector and air delivery system therefor in accordance with this embodiment.
Figure 3:
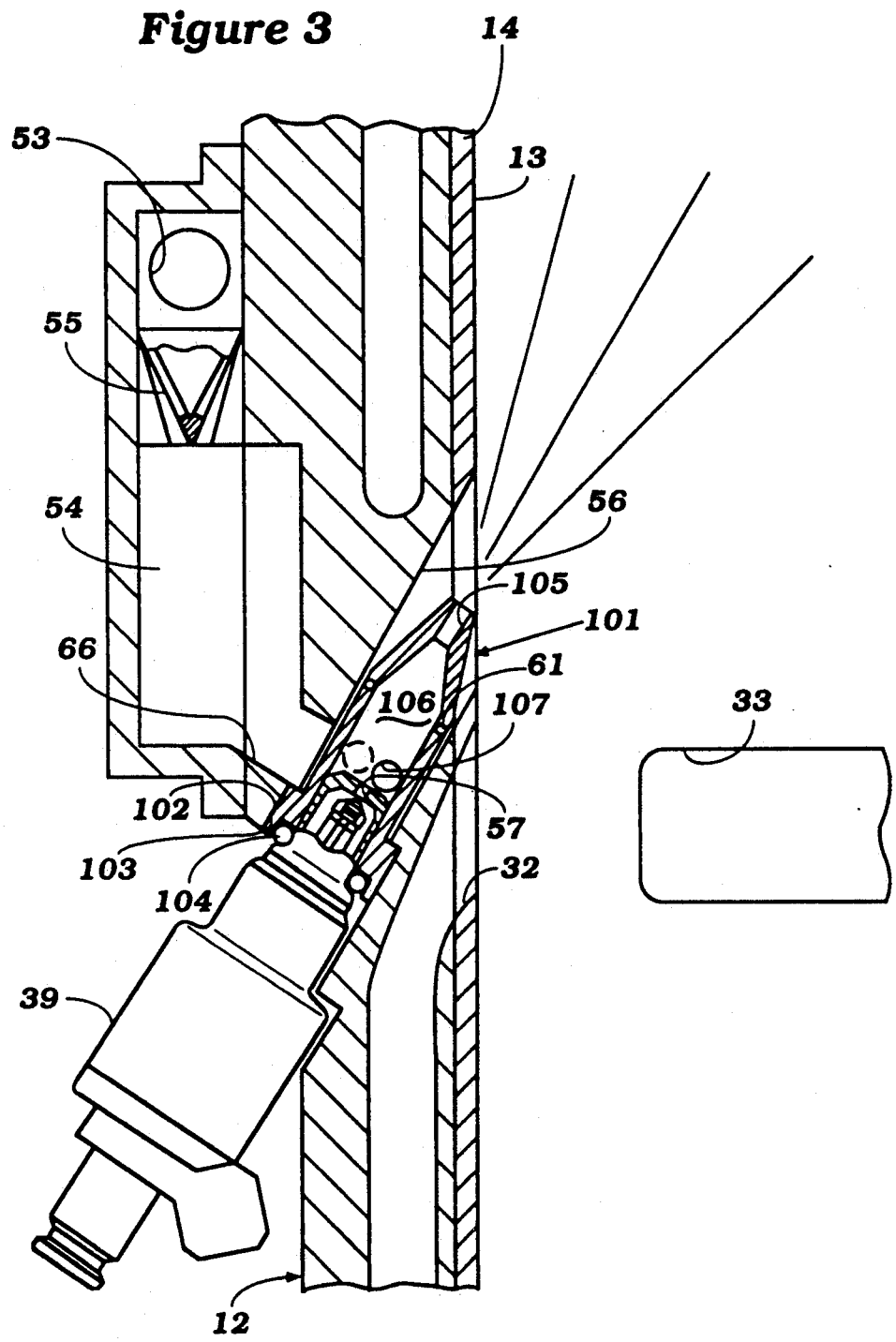
FIG. 3 is an enlarged cross sectional view, in part similar to FIG. 2, and shows another embodiment of the invention.

In the embodiment of FIGS. 1 and 2, the nozzle insert 58 was formed integrally with the fuel injector 39. Accordingly, it was necessary to use a special fuel injector. FIG. 3 shows another embodiment of the invention, which is generally similar to the embodiment of FIGS. 1 and 2, but wherein the nozzle insert is formed as a separate element. Since the construction of the nozzle insert is the only portion of this embodiment that differs from the previously embodiment, components which are the same or substantially the same have been identified by the same reference numerals and will be described again only insofar as is necessary to understand the construction and operation of this embodiment.

In this embodiment, a nozzle insert, indicated generally by the reference numeral 101 has a first larger diameter portion 102 that is received within a counter bore 103 formed in the cylinder block 12 at the base of the conduit 56. The portion 103 has an inlet opening that is sized to receive and support the end of the injector 39 around its nozzle opening 57. An O ring seal 104 sealingly engages the area between the injector 39 and the nozzle insert 101. The injector 39 may be supported and fixed to the engine in any suitable manner.

The nozzle insert 101 has a reduced diameter nozzle outlet opening port 105 that is juxtaposed to the conduit opening 56 in the cylinder liner 14. It should be noted that the conduit opening 56 need not be the same diameter in the cylinder block 12 as in the cylinder liner 14. That is, a somewhat smaller opening may be formed in the cylinder liner 14 than in the cylinder block. Even if this is done, however, the nozzle insert opening 105 is substantially smaller in effective flow area than that of the conduit opening in the cylinder liner 14. This is to insure that the cylinder liner opening cannot become clogged with foreign material.

A chamber 106 is formed by the nozzle insert 101 and air is delivered to this chamber from the accumulator 54 through the air port 66. However, in this embodiment, an opening 107 is formed in the nozzle insert 101 which opening 107 extends perpendicularly to the conduit 56 and to the chamber 106 of the insert 101 at one side of it so as to establish a swirl in the chamber 106 which will further aid in the fuel distribution and mixing as well as vaporization. Like the previously described embodiment, the nozzle insert 101 may be easily removed for inspection, servicing and resizing.

Figure 4:
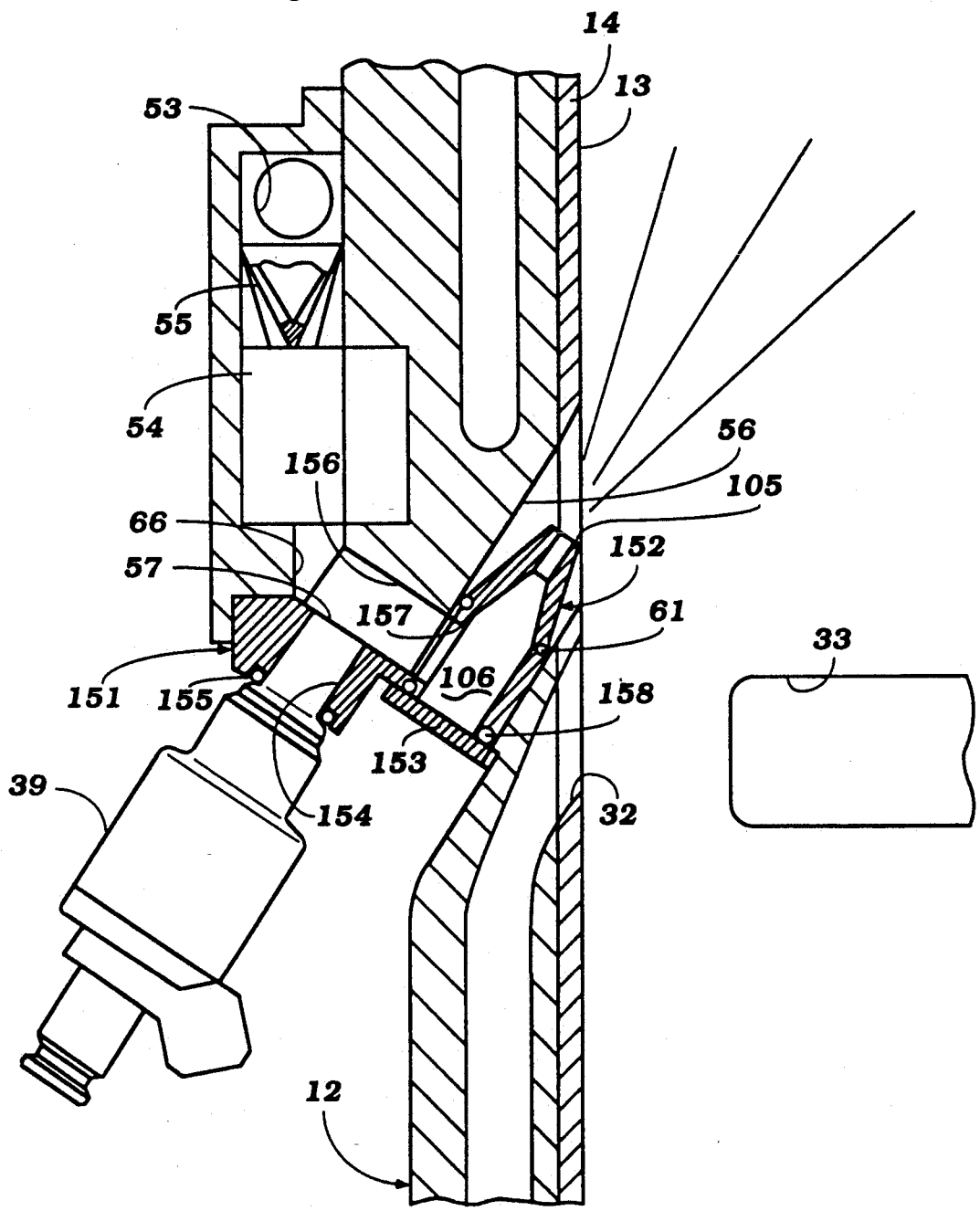
FIG. 4 is an enlarged cross sectional view, in part similar to FIGS. 2 and 3, and shows another embodiment of the invention.

In the embodiments as thus far described, the fuel injector 39 has had its nozzle port 57 communicating directly with the interior of the nozzle insert. In some instances, it may be desirable to have the fuel injector nozzle 57 spray fuel upstream of the injector insert so as to provide further mixing. FIG. 4 shows such an embodiment. This embodiment is generally the same as the preceding embodiments, except insofar as will be noted. For that reason, components which are the same as those of the previously described embodiments have been identified by the same reference numerals.

In this embodiment, a nozzle insert, indicated generally by the reference numeral 151 has a nozzle insert portion 152 which is configured like the nozzle insert 101 of the previously described embodiment. Therefore, the nozzle port 105 and chamber 106 have been identified by the same reference numerals. In this embodiment, however, a closure 153 is formed at the outer end of the chamber 106 and an injector nozzle receiving bore 154 is positioned adjacent the chamber 156. An O ring seal 155 sealingly engages the fuel injector 39 where it enters the nozzle opening 154.

The injector 39 and specifically its nozzle portion 57 sprays fuel into a chamber 156 that is formed directly in the cylinder block 12 and which receives air from the communication port 66. This chamber 156 is opened to the conduit 56 between the ends of the injector insert portion 152. A fuel air receiving opening 157 is formed in this portion of the nozzle insert 152 which is substantially perpendicular to the conduit 56 and also the chamber 106 and communicates the chamber 106 with the chamber 156. The O ring seal 61 and a further seal 158 provide a seal between the conduit 56 and the nozzle insert portion 152 on opposite sides of the opening 157 to avoid air and fuel leakage.

It should be readily apparent from the foregoing description that the described embodiments are particularly adapted in providing an efficient and low cost fuel injection system that has all of the advantages of direct and manifold fuel injectors without the disadvantages of either. In addition, the system can be easily serviced and replaced, if desired. It should be noted that the delivery system for air supply to the accumulator chamber 54 was provided by the main scavenge pump 27. However, other air sources are possible, for example, those shown in copending application Ser. No. 831,786. Various other changes and modifications may be made without departing from the spirit and scope of the invention, as defined by the appended claims.

We claim:

1. A fuel injection system for an internal combustion engine having a variable volume combustion chamber defined by a pair of relatively moveable components, a nozzle port extending through one of said components and opened and closed only by the relative movement of said components, a conduit extending to said nozzle port from externally of said combustion chamber and formed at least in part by one of said components, a nozzle insert inserted into said conduit and having an inlet opening of cross section substantially the same as said conduit and an unvalved outlet opening juxtaposed to said nozzle port and having a substantially smaller effective flow area than said nozzle port, a chamber formed between said inlet opening and said outlet opening, means for delivering a pressurized gas to said chamber, at least during a portion of the time when said nozzle port is open, and a fuel injector for injecting fuel into said chamber.

2. A fuel injection system as set forth in claim 1 wherein the conduit opens through the outer periphery of the component in which it is formed for removal and insertion of the nozzle insert from externally of the component.

3. A fuel injection system as set forth in claim 2 wherein the nozzle insert at least partially closes the opening of the conduit through the component of the engine in which it is formed.

4. A fuel injection system as set forth in claim 3 wherein the fuel injector injects fuel directly into the inlet opening of the nozzle insert.

5. A fuel injection system as set forth in claim 4 wherein the nozzle insert is formed as a unit with the fuel injector.

6. A fuel injection system as set forth in claim 4 wherein the nozzle insert inlet opening is formed to receive the fuel injector.

7. A fuel injection system as set forth in claim 3 wherein the nozzle insert forms a complete closure for the opening.

8. A fuel injection system as set forth in claim 7 wherein the inlet opening of the nozzle insert extends generally perpendicularly to the conduit.

9. A fuel injection system as set forth in claim 8 wherein the fuel and pressurized gas are both mixed externally of the chamber and prior to delivery to the chamber.

10. A fuel injection system as set forth in claim 1 wherein the pressurized gas is delivered to the chamber in a direction to induce a swirl in the chamber.

11. A fuel injection system as set forth in claim 1 wherein the engine is a reciprocating engine and one of the components comprises a piston and the other of the components comprises a cylinder block and cylinder head assembly.

12. A fuel injection system as set forth in claim 11 wherein the nozzle port is formed by an opening in the wall of the cylinder block.

13. A fuel injection system as set forth in claim 12 wherein the conduit is open through the outer periphery of the cylinder block and cylinder head assembly for removal and insertion of the nozzle insert from externally of the assembly.

14. A fuel injection system as set forth in claim 13 wherein the nozzle insert at least partially closes the opening of the conduit through the cylinder head and cylinder block assembly.

15. A fuel injection system as set forth in claim 14 wherein the fuel injector injects fuel directly into the inlet opening of the nozzle insert.

16. A fuel injection system as set forth in claim 15 wherein the nozzle insert is formed as a unit with the fuel injector.

17. A fuel injection system as set forth in claim 15 wherein the nozzle insert inlet opening is formed to receive the fuel injector.

18. A fuel injection system as set forth in claim 14 wherein the nozzle insert forms a complete closure for the opening.

19. A fuel injection system as set forth in claim 18 wherein the inlet opening of the nozzle insert extends generally perpendicularly to the conduit.

20. A fuel injection system as set forth in claim 19 wherein the fuel and pressurized gas are both mixed externally of the chamber and prior to delivery to the chamber.

21. A fuel injection system as set forth in claim 12 wherein the pressurized gas is delivered to the chamber in a direction to induce a swirl in the chamber.

22. A fuel injection system as set forth in claim 12 further including means for delivering air for combustion to the combustion chamber other than through the nozzle port.

23. A fuel injection system as set forth in claim 22 wherein the air for combustion is delivered to the combustion chamber through a scavenge port formed in the cylinder block and head assembly.

24. A fuel injection system as set forth in claim 23 wherein the nozzle port is formed adjacent the scavenge port.

25. A fuel injection system as set forth in claim 24 wherein the combustion chamber includes a combustion recess and further including a spark plug positioned in the combustion recess and wherein the nozzle port is directed toward the spark plug.

26. A fuel injection system as set forth in claim 25 further including an exhaust port in the cylinder block and head assembly and opened and closed by the piston.

* * * * *